Figure 1:
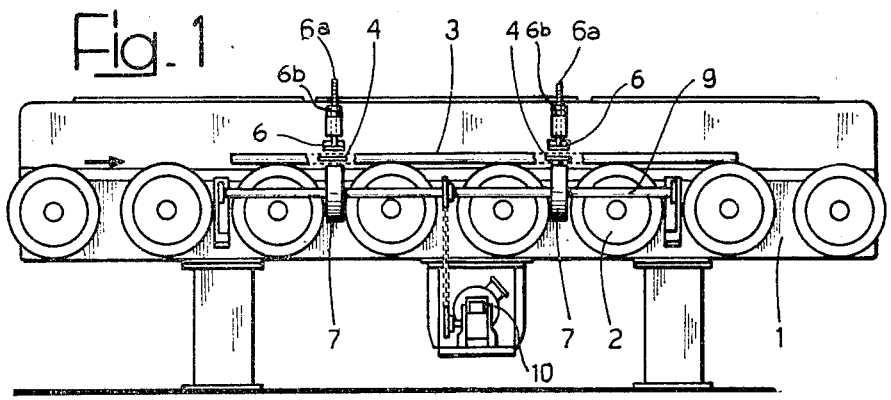

United States Patent
Olivotto

[15] 3,670,904
[45] June 20, 1972

[54] APPARATUS FOR COLLECTING GLASS TUBES AT THE END OF A PRODUCTION

[72] Inventor: Vanfrido Olivotto, Via Carlo Capelli 85, Turin, Italy

[22] Filed: Feb. 17, 1971

[21] Appl. No.: 116,017

[30] Foreign Application Priority Data

March 23, 1970 Italy..................................67984 A/70

[52] U.S. Cl..................................214/1 P, 188/271, 193/32
[51] Int. Cl..........................................................B65g 47/74
[58] Field of Search...............214/1 P, 1 R, 1 BE; 193/32, 193/40; 188/271

[56] References Cited

UNITED STATES PATENTS

| | | |
|---|---|---|
| 2,306,955 | 12/1942 | Karbusky..............................193/32 X |
| 2,761,633 | 9/1956 | Sindzinski............................193/32 X |
| 3,342,302 | 9/1967 | Ledebur..............................214/1 P X |
| 3,446,367 | 5/1969 | Anderson................................214/1 P |

Primary Examiner—Robert G. Sheridan
Assistant Examiner—Frank E. Werner
Attorney—Sughrue, Rothwell, Mion, Zinn & Macpeak

[57] ABSTRACT

A glass tube production line in which glass tube sections are conveyed lengthwise along a conveyor at high speed is provided with frictional braking means for annulling the lengthwise speed of each tube section, permitting collection of the latter on a surface at one side of the conveyor. The braking is effected by ejecting the glass tube sections laterally from the conveyor so that they enter transverse passages defined between respective pairs of braking elements, each passage tapering in width so that each tube section is braked by contact with surfaces of friction material on the braking elements as it passes through said passages.

4 Claims, 3 Drawing Figures

PATENTED JUN 20 1972 3,670,904

INVENTOR

VANFRIDO OLIVOTTO

BY Sughrue, Rothwell, Mion, Zinn & Macpeak
ATTORNEYS

APPARATUS FOR COLLECTING GLASS TUBES AT THE END OF A PRODUCTION

This invention relates to apparatus for collecting glass tubes at the end of a production line.

At the end of a glass tube production line, when the tube is sufficiently cooled, it is cut into sections of a desired length, (typically from 1 to 2 meters).

Collection of the tube sections is effected, in known apparatus, by ejecting the tube sections transversely from a conveyor on to a collection surface, which is generally inclined to the horizontal so that the tube sections roll away from the conveyor.

Modern techniques for the continuous production of glass tube employ increasingly high tube speeds (300 meters per minute and more), adding considerably to the difficulty of orderly collection of the tube sections.

With increasing speeds of the tube production the problem arises of reducing the longitudinal speed of each tube section before it is displaced laterally for collection. Abrupt stopping of the rapidly advancing tube section, for example by means of a stop, would involve a collision with the likelihood of excessive numbers of breakages and rejects.

An object of this invention is to provide glass tube collection apparatus in which the longitudinal speed of each tube section is reduced by frictional braking, reducing the tendency for tube breakage.

More specifically, it is an object of the invention to provide an apparatus for collecting glass tubes at the end of a production line, in which the apparatus is adapted to cooperate with known means for ejecting sections of tube transversely from a conveyor upon which the sections are advanced at high speed in the direction of their longitudinal axes, and in which means are provided for braking each tube section so as to annul the longitudinal speed thereof, said means comprising at least two pairs of braking elements having external braking surfaces of friction material between which are defined respective transverse passages for the tube sections, the said passages being aligned in a direction parallel to the longitudinal axes of the tube sections on the conveyor and each tapering in width away from the conveyor.

Figure 2:
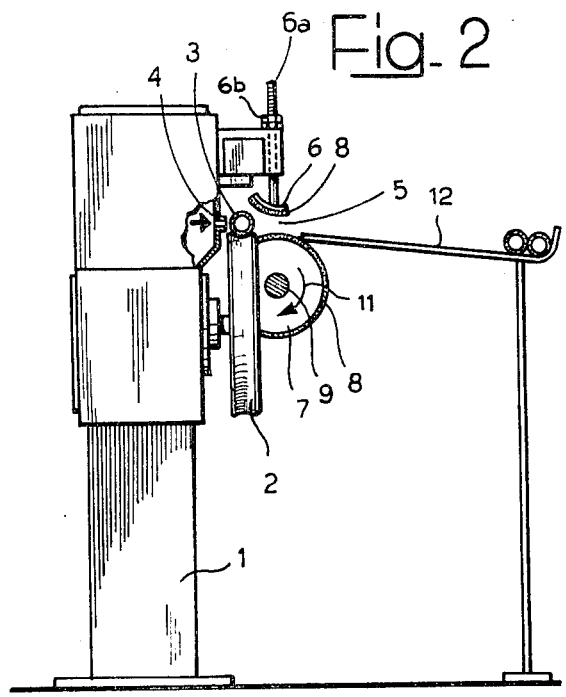
Figure 3:
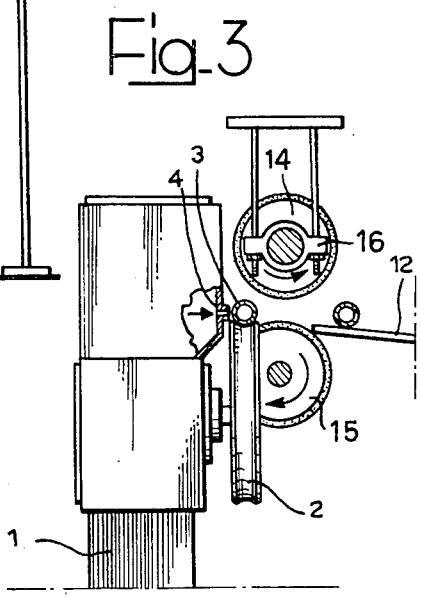

The invention will be better understood from the following description, given by way of non-limiting example, with reference to the attached drawings, in which:

FIG. 1 is a diagrammatic front elevational of glass tube collection apparatus according to one embodiment of the invention, FIG. 2 is a diagrammatic transverse section of the collection apparatus of FIG. 1, and FIG. 3 is a diagrammatic transverse section of collection apparatus according to an alternative embodiment of the invention.

In the drawings a frame 1 is shown supporting conveyor wheels 2 for the high-speed advancement of glass tube sections 3 in the direction of their longitudinal axes. The conveyor wheels 2 are grooved to receive the respective tube sections 3, the conveyor axis being perpendicular to the axes of rotation of the wheels 2.

Two ejectors are arranged to push each section 3 laterally just as it reaches an unloading position. In the example illustrated the ejectors are of the pneumatic type in which compressed air is directed transversely on to the tube section 3 from a respective slot 4. Mechanical ejectors could also be employed.

The tube section 3 ejected from the conveyor wheels 2 is gripped between two pairs of braking elements, each pair comprising a skid 6 and a wheel 7. The skids 6 and the wheels 7 each have a covering of a material having a high coefficient of friction, for example, rubber. The wheels 7 are mounted on a shaft 9 extending perpendicular to the axes of the conveyor wheels 2 and driven in slow rotation (compared with the speed of the wheels 2) in the direction of the arrow 11 by a motor 10.

The skids 6 are provided with stems 6a, sliding vertically in guides carried by the frame 1 and biassed downwardly towards the respective wheels 7 by their weight. The lowermost position of each skid 6 is regulated by a nut 6b on a threaded part of the stem 6a, so that the distance of the skid 6 from the periphery of the respective wheel 7 is slightly smaller than the diameter of the tube section 3.

Each skid 6 has a downwardly convex surface, so that between each skid 6 and the respective wheel 7 there is formed a passage 5 which tapers in width in the direction in which the tube section 3 is ejected, that is, in a direction away from the conveyor axis.

When a tube section 3 is ejected from the grooves of the conveyor wheels 2 it becomes wedged in the two tapering passages 5 and its longitudinal motion is thus braked frictionally. The slow rotation of the wheels 7 causes the tube section 3 to pass through the passages 5, this being allowed by the lifting of the skids 6 by the tube section 3 itself. Upon leaving the passages 5 the tube sections 3 are collected on a collection surface 12. As an alternative the tube sections 3 could be forwarded to other machines placed in the production line.

This invention has been illustrated and described in a preferred embodiment, but it is understood that modifications and variations can be made without departing from the scope of this invention.

In particular, as illustrated diagrammatically in FIG. 3, the tube braking means can be formed by pairs of rotating wheels 14, 15 one of which 14 is displaceable vertically, in a direction transverse to the direction of tube ejection, and can be regulated, by an adjustable stop 16, at a minimum height above the other wheel 15, according to the tube diameter, as illustrated diagrammatically in FIG. 3.

In another variation the skid could be placed beneath and the rotating wheel above the respective tube braking passage; in this case a spring or springs would be provided to bias the skid towards the wheel.

In a further variation the tube section could be deviated downwards or upwards and be collected in passages formed by skids and wheels, or by pairs of wheels, as described previously.

I claim:

1. In a production line for glass tubes having a conveyor along which glass tube sections are conveyed in the direction of their longitudinal axes and means ejecting sections of glass tube transversely from the conveyor, apparatus for collecting glass tubes at the end of the production line on which the improvement consists in braking means at the end of the production line effective to annul the longitudinal speed of each tube section, the said braking means comprising at least two pairs of braking elements, each having external braking surfaces of friction material, said pairs of braking elements defining respective transverse passages, aligned in a direction parallel to the longitudinal axes of the tube sections on the conveyor, and positioned adjacent the tube ejection means to receive tubes ejected from the conveyor, each said passage tapering in width away from the conveyor, whereby each tube passing through said passages is braked frictionally.

2. Apparatus as claimed in claim 1, including means rotating at least one braking element of each pair about an axis substantially parallel to the longitudinally axes of the tube sections on the conveyor, in a sense to eject each successive tube section through the respective passage in a transverse direction away from the conveyor.

3. Apparatus as claimed in claim 2, wherein each pair of braking elements comprises a rotating element, means rotating said element slowly about an axis parallel to the longitudinal axes of the tube sections on the conveyor, a skid element means supporting said skid element for sliding movement in a direction perpendicular to the transverse direction of ejection of the tube sections from the conveyor, means biassing each said skid element towards the rotating braking element, and means regulating the minimum distance between the skid element and the rotating element according to the diameter of the tube sections to be braked.

4. Apparatus as claimed in claim 1, including means rotating the two braking elements of each said pair slowly about axes parallel to the longitudinal axes of the tube sections on the conveyor, the said braking elements being displaceable relative to each other in a direction perpendicular to the transverse direction of ejection of the tube sections from the conveyor, means biassing the two rotating braking elements towards each other and means regulating the minimum distance between said elements according to the diameter of the tube section to be braked.

* * * * *